(12) United States Patent
Nakamura

(10) Patent No.: US 7,987,880 B2
(45) Date of Patent: Aug. 2, 2011

(54) RUBBER COMPOSITION FOR TIRE BASE TREAD

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 486 days.

(21) Appl. No.: 12/273,588

(22) Filed: Nov. 19, 2008

(65) Prior Publication Data

US 2009/0107598 A1    Apr. 30, 2009

Related U.S. Application Data

(62) Division of application No. 11/867,267, filed on Oct. 4, 2007, now abandoned.

(30) Foreign Application Priority Data

Oct. 30, 2006  (JP) ................. 2006-293911

(51) Int. Cl.
| | |
|---|---|
| B60C 11/00 | (2006.01) |
| B60C 1/00 | (2006.01) |
| C08K 5/39 | (2006.01) |
| C08K 5/40 | (2006.01) |
| C08L 9/00 | (2006.01) |

(52) U.S. Cl. ............ 152/209.1; 524/239; 524/240; 524/238; 524/201; 524/393; 524/392; 524/572; 524/571; 525/333.2; 525/332.6; 525/332.7; 525/232

(58) Field of Classification Search ............... 152/209.1; 524/201, 239
See application file for complete search history.

(56) References Cited

U.S. PATENT DOCUMENTS

| | | | |
|---|---|---|---|
| 3,869,435 A * | 3/1975 | Trivette, Jr. ................ 525/341 |
| 4,616,069 A | 10/1986 | Watanabe et al. |
| 4,824,908 A | 4/1989 | Tsutsumi et al. |
| 5,017,636 A | 5/1991 | Hattori et al. |
| 6,809,146 B2 * | 10/2004 | Obrecht et al. ............ 524/505 |
| 6,825,282 B2 * | 11/2004 | Jeske et al. ............... 525/331.8 |
| 2001/0051685 A1 | 12/2001 | Obrecht et al. |
| 2002/0036043 A1 * | 3/2002 | Victor Thielen ........... 152/517 |
| 2002/0058760 A1 | 5/2002 | Jeske et al. |
| 2003/0015272 A1 * | 1/2003 | Teratani et al. ............ 152/406 |
| 2003/0088023 A1 * | 5/2003 | Motofusa et al. .......... 525/63 |
| 2004/0220351 A1 * | 11/2004 | Hojo et al. ................ 525/340 |

FOREIGN PATENT DOCUMENTS

| | | |
|---|---|---|
| JP | 61-103904 | 5/1986 |
| JP | 2001-2833 | 1/2001 |
| JP | 2002-36832 | 2/2002 |
| JP | 2004-256792 | 9/2004 |
| JP | 2005-263892 | 9/2005 |
| JP | 2005-263892 A * | 9/2005 |
| JP | 2005-290356 | 10/2005 |
| JP | 2006-45471 | 2/2006 |
| JP | 2006-169464 | 6/2006 |
| JP | 2006-169464 A * | 6/2006 |

OTHER PUBLICATIONS

Kato et al., JP 2006-169464 (Jun. 2006) translation in English.*

* cited by examiner

*Primary Examiner* — Rip A. Lee
(74) *Attorney, Agent, or Firm* — Fish & Richardson P.C.

(57) ABSTRACT

The rubber composition for a tire base tread includes a rubber component containing not less than 15% by weight of a terminal-modified diene rubber having a number average molecular weight prior to modification of 150000 to 400000, a filler, and a compound (vulcanizing agent) represented by the following general formula (1) in an amount of 0.5 to 5 parts by weight based on 100 parts by weight of the rubber component:

$$\begin{array}{c}R\\ \diagdown\\ N-\overset{\overset{\displaystyle S}{\|}}{C}-S-S-(CH_2)_n-S-S-\overset{\overset{\displaystyle S}{\|}}{C}-N\diagup\overset{R}{\diagdown R}\\ \diagup\\ R\end{array} \quad (1)$$

(wherein R represents a benzyl group, and n represents an integer of 3 to 12.)

3 Claims, No Drawings

RUBBER COMPOSITION FOR TIRE BASE TREAD

CROSS-REFERENCE TO RELATED APPLICATIONS

This application is a divisional (and claims the benefit of priority under 35 USC 120-121) of pending U.S. application Ser. No. 11/867,267, filed Oct. 4, 2007, now abandoned and also claims the benefit of foreign priority Japanese Application No. 2006-293911, filed Oct. 30, 2006. The disclosure of the prior application is considered part of (and is hereby incorporated by reference in) the disclosure of this application.

BACKGROUND OF THE INVENTION

1. Field of the Invention

The present invention relates to a rubber composition for a tire base tread for use in a base rubber layer in a tread rubber portion of a pneumatic tire.

2. Description of the Related Art

In recent years, a pneumatic tire has been increasingly demanded to be improved in low fuel consumption property. In order to meet such a demand, a terminal-modified diene rubber has been developed (see, Japanese Application Kokai No. 61-103904). The terminal-modified diene rubber is good in compatibility with a filler as a reinforcing agent such as carbon black or silica as compared with general unmodified diene rubbers. For this reason, it is capable of suppressing heat generation and improving the low fuel consumption property.

However, in order to improve the effect of the low fuel consumption property, it is necessary that the number of terminals is increased and that a larger amount of a modifier is added thereto. To this end, in general, a diene rubber is reduced in molecular weight to be used. Further, for the terminal-modified diene rubber, the dispersibility of the filler is improved by the effect of the modifier for the terminal. These cause reduction in hardness in a rubber composition for a tire base tread including a terminal-modified diene rubber added therein. This unfavorably leads to inferior driving stability.

When, to such a reduction in hardness, the enhancement in hardness is tried to be achieved with a conventional technique such as an increase in amount of the filler or a decrease in amount of the oil, the low fuel consumption property tends to be degraded. This results in a reduction of the low fuel consumption property improving effect by the use of the terminal-modified diene rubber.

On the other hand, there is also conceivable another measure in which the crosslinking density is increased by an increase in amount of sulfur as a vulcanizing agent for the enhancement in hardness. In that case, although the hardness and the low fuel consumption property are compatible with each other, the flexural fatigue characteristic is degraded due to the increase in crosslinking density.

Incidentally, for a rubber composition conventionally for use in the tread of a tire or the like, there is known the one obtained by adding 1,6-bis(N,N'-dibenzyl thiocarbamoyl dithio)hexane as a vulcanizing agent to a diene rubber, (see, Japanese Application Kokai Nos. 2001-2833, 2004-256792, 2005-263892, and 2006-45471). However, in the related arts, the vulcanizing agents. are used for controlling the changes with time with respect to heat, and improving the durability. Thus, unknown are the hardness recovering effect due to use in combination with a terminal-modified diene rubber having a specific molecular weight, and the effect of achieving the compatibility between the driving stability and the low fuel consumption property resulting therefrom.

Japanese Application Kokai No. 2002-36832 discloses a rubber composition using a diene rubber modified with a terminal modifier such as 3-glycidoxypropyl triethoxysilane, and 1,6-bis(N,N'-dibenzyl thiocarbamoyl dithio)hexane as a vulcanizing agent in combination. However, in this document, the rubber composition is used for the rubber reinforcing layer disposed on the inside of the sidewall portion or a bead filler. The effect of achieving the compatibility between the low fuel consumption property and the driving stability due to use for a base tread is not disclosed at all.

SUMMARY OF THE INVENTION

The present invention has been completed in view of the foregoing. It is therefore an object of the invention to provide a rubber composition for a tire base tread which is capable of suppressing the reduction of the hardness due to use of a terminal-modified diene rubber, and achieving the compatibility between the low fuel consumption property and the driving stability without loss of the flexural fatigue characteristic.

In accordance with an aspect of the present invention, a rubber composition for a tire base tread includes a rubber component containing a terminal-modified diene rubber having a number average molecular weight prior to modification of 150000 to 400000 in an amount of 15% by weight or more, a filler, and a compound represented by the following general formula (1) in an amount of 0.5 to 5 parts by weight per 100 parts by weight of the rubber component:

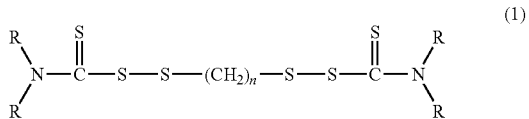

(where in the formula, R represents a benzyl group, and n represents an integer of 3 to 12.)

According to an aspect of the present invention, by using a terminal-modified diene rubber having a number average molecular weight prior to modification of 150000 to 400000, and using the specific vulcanizing agent in combination, it is possible to improve the hardness without impairing the effect of improving the low fuel consumption property due to the terminal-modified diene rubber, and without degrading the flexural fatigue characteristic. Thus, it is possible to achieve the compatibility between the low fuel consumption property and the driving stability.

DETAILED DESCRIPTION OF THE INVENTION

Below, matters related to embodiments of the present invention will be described in details.

A rubber component in a rubber composition in accordance with the invention contains a terminal-modified diene rubber having a number average molecular weight prior to modification of 150000 to 400000. The type of such a diene rubber which is terminal modified has no particular restriction. Mention may be made of butadiene rubber (BR such as high cis BR having a cis-1,4 bond content of 90% or more, or BR containing syndiotactic-1,2-polybutadiene (SPB)), styrene butadiene rubber (SBR), natural rubber (NR), isoprene rubber (IR), styrene/isoprene copolymer rubber, butadiene/ isoprene copolymer rubber, and the like. More preferred are BR and SBR, and further preferred is BR.

As the terminal-modified diene rubbers, diene rubbers modified with various modifiers at the polymer terminals can be used. For the modification methods, known various methods are also usable. Specifically, as the modifiers, mention may be made of tin compounds, aminobenzophenone compounds, isocyanate compounds, diglycidyl amine compounds, cyclic imine compounds, alkoxysilane halide compounds, glycidoxy propyl methoxysilane compounds, neodymium compounds, and the like.

For the terminal-modified diene rubbers to be used, the number average molecular weight (Mn) of the polymer prior to modification is 150000 to 400000, and more preferably 150000 to 250000. When the Mn is less than 150000, a sufficient strength cannot be exerted. Conversely, when the Mn exceeds 400000, the rubber is inferior in the effect of improving the low fuel consumption property. In addition, when the polymer molecules are bonded to each other due to the terminal modification, resulting in a two-fold or three-fold molecular weight, the processing thereof is difficult to carry out. Herein, the number average molecular weight (Mn) is the value measured with GPC (gel permeation chromatography), in a solvent: THF (tetrahydrofuran), and at 40° C.

The rubber component contains the terminal-modified diene rubber in an amount of 15% by weight or more. When the content is less than 15% by weight, the low fuel consumption property cannot be improved. The content is more preferably 20% by weight or more. The rubber component may include a terminal-modified diene rubber alone (i.e., in an amount of 100% by weight). Alternatively, it may be a blend with other diene rubbers not terminal modified. Such other diene rubbers have no particular restriction. Examples thereof may include natural rubber, isoprene rubber, styrene butadiene rubber, and butadiene rubber. These can be mixed in combination of one, or two or more thereof to be added. Particularly preferred examples thereof include a blend of terminal-modified BR and unmodified NR. Namely, the rubber component preferably includes 20 to 60 parts by weight of terminal-modified BR and 80 to 40 parts by weight of unmodified NR.

As the fillers in the rubber composition in accordance with the invention, various reinforcing fillers such as carbon black, silica, clay, and calcium carbonate can be used. Preferably, carbon black, silica, or a combination of carbon black and silica is used.

The amount of the filler to be added has no particular restriction. However, generally, it is 20 to 80 parts by weight, and more preferably 30 to 60 parts by weight per 100 parts by weight of the rubber component.

To the rubber composition in accordance with the invention, as a vulcanizing agent, the compound represented by the general formula (1) is added. The vulcanizing agent has a relatively long molecular chain crosslinking between polymer molecules. For this reason, it can crosslink while having flexibility. Therefore, it is possible to recover the reduction of the hardness of the rubber composition due to the use of the terminal-modified diene rubber with a relatively small molecular weight prior to modification without loss of the flexural fatigue characteristic with gentle crosslinking by the vulcanizing agent. This enables the improvement of the driving stability. From such a viewpoint, n in the formula is preferably 4 to 12, and more preferably 4 to 10. Specifically, the compound is preferably 1,6-bis(N,N'-dibenzyl thiocarbamoyl dithio)-hexane or 1,10-bis(N,N'-dibenzyl thiocarbamoyl dithio)-decane. In particular preferably, it is 1,6-bis(N,N'-dibenzyl thiocarbamoyl dithio)-hexane.

The compound is added in a ratio of 0.5 to 5 parts by weight per 100 parts by weight of the rubber component. It is more preferably added in a ratio of 0.5 to 3 parts by weight. When the amount of the compound to be added is less than 0.5 part by weight, it is not possible to improve the driving stability. Conversely, when the amount exceeds 5 parts by weight, the flexural fatigue characteristic is reduced.

To the rubber composition in accordance with the invention, other than the foregoing components, various additives commonly used in a rubber composition for a tire base tread such as an antioxidant, zinc white, stearic acid, a softening agent, sulfur, and a vulcanization accelerator can be added.

In a pneumatic tire having a tread rubber portion in a two-layered structure including a cap rubber layer and a base rubber layer, the rubber composition including the foregoing components is used as rubber for forming the base rubber layer. More particularly, it is used as a rubber composition for forming the base rubber layer in a pneumatic tire which includes a tread rubber portion on the outside in the tire radial direction of a belt disposed around the outer circumference of a crown portion of a carcass, the tread rubber portion including a cap rubber layer serving as a grounding side, and a base rubber layer disposed between it and a belt on the inside in the redial direction.

The tire manufacturing can be carried out in accordance with an ordinary method. Namely, the rubber composition is mixed in a mixing machine such as a roll or a mixer. Then, the resulting sheet-like one is stacked with an unvulcanized sheet-like rubber for forming the cap rubber layer. Then, it is subjected to vulcanization forming according to an ordinary method to be formed as the base rubber layer, resulting in a pneumatic tire.

EXAMPLES

Below, the present invention will be described by way of examples, which should not be construed as limiting the scope of the invention.

By the use of a Banbury mixer, respective rubber compositions for base treads of Examples and Comparative Examples were prepared according to the formulations shown in Table 1 below. The respective components in Table 1 are as follows.

Terminal-modified BR: BR modified with a tin compound ("BR1250H" manufactured by ZEON Corp., number average molecular weight prior to modification=200000), NR: Natural rubber RSS #3, High cis BR: unmodified BR having a cis-1,4 bond content of 98% ("BR150", manufactured by UBE Industries Ltd., number average molecular weight=200000), CB: carbon black N550 ("SEAST SO" manufactured by TOKAI CARBON Co., Ltd.), Sulfur: 5% oil treated powder sulfur ("Sulfur 150 mesh" manufactured by Hosoi Chemical Industry Co., Ltd.), Vulcanizing agent (1): 1,6-bis(N,N'-dibenzyl thiocarbamoyl dithio)-hexane ("KA9188" manufactured by Bayer)

To each rubber composition, as common formulations, 3 parts by weight of a mineral oil (aroma oil, "X-140" manufactured by JOMO), 1 part by weight of an antioxidant (N-phenyl-N-(1,3-dimethylbutyl)-p-phenylenediamine), 2 parts by weight of stearic acid ("Industrial stearic acid" manufactured by Kao Corp.), 3 parts by weight of zinc oxide ("zinc white No. 1"manufactured by Mitsui Mining & Smelting Co., Ltd.), and 1.5 parts by weight of a vulcanization accelerator (N-tetrabutyl-2-benzothiazolsulpheneamide) were added per 100 parts by weight of the rubber component.

For each rubber composition, vulcanization was carried out at 160° C. for 30 minutes to form a test piece in a prescribed shape. By the use of the resulting test piece, the loss factor (tan δ), the hardness, and the flexural fatigue characteristic were measured in the following manner. Whereas, using each rubber composition as a rubber composition for a base tread, a pneumatic radial tire of 205/65R15 was manufactured according to an ordinary method. Then, the driving stability was evaluated in the following manner.

tan δ: According to JIS K-6394, the loss factor tan δ is measured under the conditions of a temperature of 50° C., a static distortion of 5%, a dynamic distortion of 1%, and a frequency of 50 Hz. It is expressed as an index with the value of Comparative Example 1 as 100. A smaller index indicates a smaller tan δ, and more excellent low fuel consumption property.

Hardness: According to JIS K-6253, by means of a type A durometer (A model), the hardness is measured at 80° C. It is expressed as an index with the value of Comparative Example 1 as 100. A smaller index indicates a lower hardness.

Driving stability: A 2000-cc FF car is equipped with four pneumatic tires, and it is caused to run at a high speed on a dry road. Thus, the feeling is expressed as an index with the value of Comparative Example 1 as 100. A larger index indicates more excellent driving stability.

Flexural fatigue characteristic: According to JIS K-6260, a cracking generation test is carried out. Thus, the number of flexing cycles until cracking occurs is expressed as an index with the value of Comparative Example 1 as 100. A larger index indicates more excellent flexural fatigue characteristic.

TABLE 1

|  |  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Composition | NR | 70 | 50 | 40 | 70 | 70 | 70 | 70 | 70 | 70 |
| (Part(s) by weight) | Terminal-modified BR | 30 | 50 | 60 |  | 30 | 30 | 30 | 30 | 10 |
|  | High cis BR |  |  |  | 30 |  |  |  |  | 20 |
|  | CB | 35 | 35 | 35 | 35 | 35 | 35 | 41 | 35 | 35 |
|  | Sulfur | 2 | 2 | 2 | 2 | 2 | 2 | 2 | 2.5 | 2 |
|  | Vulcanizing agent (1) | 0.5 | 1 | 2 |  |  | 0.2 |  |  | 0.5 |
|  | tan δ | 90 | 85 | 80 | 100 | 90 | 90 | 100 | 90 | 100 |
|  | Hardness | 100 | 100 | 100 | 100 | 95 | 97 | 100 | 100 | 102 |
|  | Driving stability | 100 | 100 | 100 | 100 | 90 | 98 | 100 | 100 | 99 |
|  | Flexural fatigue characteristic | 105 | 108 | 110 | 100 | 110 | 107 | 90 | 85 | 95 |

As shown in Table 1, relative to Comparative Example 1 using unmodified high cis BR, in Comparative Example 2 in which the high cis BR was merely replaced with terminal-modified BR, the low fuel consumption property was excellent, but the hardness was reduced, and the driving stability was inferior. In Comparative Example 4 in which carbon black was increased in amount in order to suppress such reduction of the hardness, the low fuel consumption property improving effect due to the use of the terminal-modified BR was impaired. Whereas, in Comparative Example 5 in which sulfur was increased in amount in order to suppress the reduction of the hardness, the low fuel consumption property was kept, and the hardness was also recovered, but the flexural fatigue characteristic was degraded.

In contrast, in Examples 1 to 3, in each of which together with the terminal-modified BR having a number average molecular weight prior to modification of 150000 to 400000, the vulcanizing agent (1) was added, the low fuel consumption characteristic was improved relative to Comparative Example 1 using unmodified BR. In addition, such a reduction of the hardness as seen in Comparative Example 2 was not caused, and the driving stability was kept. As a result, the low fuel consumption property and the driving stability were compatible with each other. Further, the flexural fatigue characteristic was also excellent.

Incidentally, as shown in Comparative Example 3, when the amount of the vulcanizing agent (1) to be added was small, the hardness recovery and the driving stability improving effect were insufficient. Whereas, when the amount of the terminal-modified BR to be added was small as in Comparative Example 6, it was not possible to obtain the effect of improving the low fuel consumption property.

The invention can be preferably usable for various pneumatic tires including a pneumatic tire for passenger car.

What is claimed is:

1. A pneumatic tire having a tread rubber portion on the outside in the tire radial direction of a belt disposed around the outer circumference of a crown portion of a carcass, the tread rubber portion including a cap rubber layer serving as a grounding side, and a base rubber layer disposed between the cap rubber layer and the belt, the base rubber layer being formed out of a rubber composition comprising a rubber component containing not less than 15% by weight of a terminal-modified polybutadiene rubber having a number average molecular weight prior to modification of 150,000 to 400,000, a filler, and a compound represented by the following general formula (1) in an amount of 0.5 to 5 parts by weight based on 100 parts by weight of the rubber component:

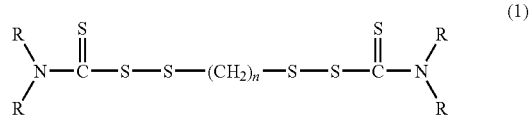

(where in the formula, R represents a benzyl group, and n represents an integer of 3 to 12).

2. The pneumatic tire according to claim 1, wherein the terminal-modified polybutadiene rubber is a polybutadiene rubber terminal-modified with a tin compound.

3. The pneumatic tire according to claim 1, wherein the compound represented by the general formula (1) is 1,6-bis (N,N'-dibenzylthiocarbmoyldithio)hexane.

* * * * *

UNITED STATES PATENT AND TRADEMARK OFFICE
CERTIFICATE OF CORRECTION

| | |
|---|---|
| PATENT NO. | : 7,987,880 B2 |
| APPLICATION NO. | : 12/273588 |
| DATED | : August 2, 2011 |
| INVENTOR(S) | : Norihiko Nakamura |

It is certified that error appears in the above-identified patent and that said Letters Patent is hereby corrected as shown below:

Column 1, line 8, after "of", delete "pending".

Column 6, line 66, in Claim 3, delete "(N,N'-dibenzylthiocarbmoyldithio)hexane" and insert --(N,N'-dibenzylthiocarbamoyldithio)hexane--.

Signed and Sealed this
Tenth Day of July, 2012

David J. Kappos
*Director of the United States Patent and Trademark Office*